Jan. 1, 1952 J. C. ACHENBACH 2,581,159

TUNABLE BAND PASS AMPLIFIER FOR TELEVISION

Filed May 28, 1948 2 SHEETS—SHEET 1

INVENTOR
JOHN C. ACHENBACH
BY [signature]
ATTORNEY

TUNABLE BAND PASS AMPLIFIER FOR TELEVISION

Filed May 28, 1948

INVENTOR
JOHN C. ACHENBACH
BY
ATTORNEY

Patented Jan. 1, 1952

2,581,159

UNITED STATES PATENT OFFICE 2,581,159

TUNABLE BAND PASS AMPLIFIER FOR TELEVISION

John C. Achenbach, Haddonfield, N. J., assignor to Radio Corporation of America, a corporation of Delaware Application May 28, 1948, Serial No. 29,882

3 Claims. (Cl. 250—20)

This invention relates to thermionic amplifiers and more particularly to thermionic amplifiers adapted to provide substantially uniform amplification of a wide band of frequencies such as may be encountered, for example, in the reception and amplification of radio frequency television signals.

In present day television systems the transmission of television signals in the radio frequency spectrum usually occupies approximately 6 mc. band width for commercial television service. Since reception of television signals is more expeditiously accomplished through the use of superheterodyne receiving type circuits, it is required that suitable amplification of the radio frequencies in the television spectrum (presently ranging from approximately 44 to 216 mc.) be accomplished and provision made for realizing this amplification concomitantly with suitable band pass characteristics of the amplifier permitting not only reception of the television carrier frequency, but also at least the above-mentioned 6 mc. video band width.

Particular attention must be given to the subject of local oscillator radiation in superheterodyne receivers operating to receive television frequencies. There has been considerable effort extended toward the economical reduction of local oscillator radiation from television receivers of present vintage since the local oscillator radiation of superheterodyne television receiver incorporating a 25 mc. video IF frequency and operating on a 60–66 mc. channel will cause interference effects in nearby television receivers using same picture IF frequency and operating on an 82–88 mc. channel. If receiver local oscillator energy is to be kept from radiating from a television antenna it is necessary that the receiver radio frequency amplifier not only provide suitable wide band amplification of radio frequency video carriers in the television spectrum, but to also provide sufficient attenuation of frequencies corresponding to local oscillator operation so as to prevent local oscillator energy from appearing across the antenna terminals of the television receiver of which the oscillator forms a part. Another function which a good radio frequency amplifier should perform in superheterodyne receivers is the attenuation of image frequencies in the radio frequency spectrum. The desirability of reducing image frequency response is well appreciated by the art in connection with superheterodyne reception of all communication channel frequencies, and with the present frequency allotment for television service image interference from certain frequency modulation channels is quite common and produces serious interference in the reproduced television image if the television receiver is not adapted to provide adequate attenuation of such image frequencies.

Many somewhat elaborate schemes have been proposed to accomplish these three functions of providing suitable band pass of high radio frequencies with corresponding attenuation of superheterodyne image frequency and local oscillator energy, but to date few devices permit realization of the three aims with sufficient economy to permit their inclusion in production model television receivers intended for sale in the medium or low price range.

According to this invention a coupling circuit is provided including a tunable input and output circuit, and in which there is included an auxiliary series resonant circuit common to both said input and output circuits and having a resonant frequency approximating the frequency of the signal for which rejection is desired, said auxiliary resonant circuit providing, by reason of its resonant frequency and circuit constants, an effect on the coupling co-efficient of the circuit over the tunable range to make the coupling circuit respond to a substantially uniform width pass band throughout its tunable range.

It is therefore a purpose of this invention to economically provide a system of radio frequency amplification, for use in communication receivers of the superheterodyne variety, which exhibits a substantially constant band pass over a wide range of operating frequencies and also imparts suitable attenuation of local oscillator energy and image frequency.

It is further an object of this invention to provide a simple method for tuning interstage coupling circuits of radio frequency amplifiers, required to display a substantially constant band pass over a considerable range of signal frequencies, wherein through suitable choice of coupling network parametric values it is possible to provide substantial attenuation of certain frequencies falling outside the tunable range of the coupling network.

It is further an object of this invention to provide a network for interstage coupling of high frequency radio amplifier stages which is simple and economical of construction, and not only provides substantially constant band pass over a tunable range of operating frequencies, but also provides desirable image frequency and local oscillator attenuation, being arranged for convenient switching to apply its tunable action to a number of frequency ranges so as to display the afore-mentioned uniform band width throughout all of its operating ranges.

Other objects of my invention will become apparent to those skilled in the art in the following detailed description in connection with the drawings. In the drawings.

Figures 1, 3, 4:
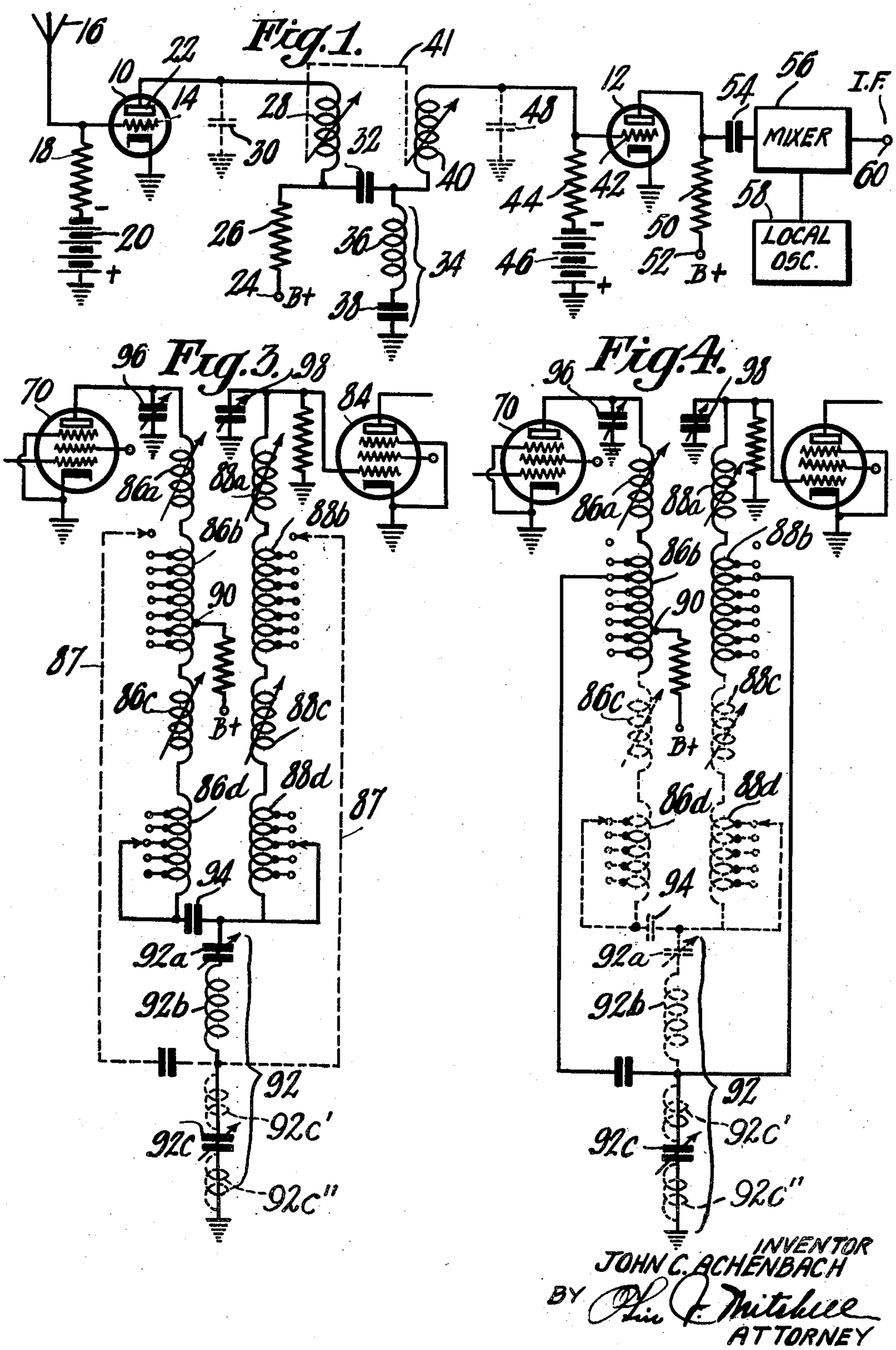
Figure 1 is a schematic representation of the basic elements required in the embodiment of my invention.
Figure 3 is a schematic representation of certain elements of the embodiment shown in Figure 2 disposed for functional operation in one operating phase.
Figure 4 is a schematic representation of the same elements shown in Figure 3 disposed for a different operating phase.

Turning now to Figure 1, there is shown, for purposes of describing my invention, an interstage coupling circuit for two thermionic amplifying tubes 10 and 12 proposed for amplification of radio frequency signals prior to their application to a superheterodyne first detector or mixer. The grid 14 of vacuum tube 10 is supplied with radio frequency signals from an antenna 16, and is connected through grid leak resistor 18 to bias potential 20. The plate supply for vacuum tube 10 is supplied from a B+ potential source terminal 24 through dropping resistor 26 and primary variable inductance 28. The total plate to cathode capacity of vacuum tube 10 in conjunction with stray wiring capacity of the circuit, is indicated by capacitor 30 shown in dotted lines. Signal energy appearing at the lower end of variable inductance 28 is coupled through blocking capacitor 32 to a series impedance element 34 comprising inductance 36 and capacitor 38. This impedance element 34 is in turn connected with a secondary variable inductance 40 having its upper end connected to control grid 42 of vacuum tube 12. Suitable negative operating bias is supplied to the control grid 42 through grid leak resistor 44 from bias source 46. The total grid to cathode capacity and stray wiring capacity to ground associated with the grid circuit of the vacuum tube 12 is represented by lumped capacity 48 shown in dotted lines. The output signal of vacuum tube 12 may be realized across plate loading resistor 50 through which plate supply energy is derived from terminal 52. Coupling capacitor 54 is adapted to connect said signal energy to further wave translating devices such as a mixer stage indicated by block 56 which heterodynes the signal appearing at the output of vacuum tube 12 with the output of a local oscillator shown by block 58 according to conventional superheterodyne action to produce an intermediate frequency made available at terminal 60.

The construction of the coupling network between vacuum tubes 10 and 12 and the value of the elements comprising impedance 34, may be selected to provide band pass over a suitable range of operating frequencies while maintaining the band pass width practically constant. This action may be understood by observing that the coupling network primary or input circuit operating from the plate 22 of vacuum tube 10 comprises variable inductor 28, blocking capacitor 32, and impedance elements 34 to ground. It will be assumed that the value of resistance 26, which provides operating potential for the plate 22 of vacuum tube 10, is sufficiently high to warrant its neglect in further considerations of the operation of the circuit, wherefore the lumped capacity 30 shown in dotted lines is the only remaining input circuit parameter of note. If the series combination of inductance 36 and capacitor 38, forming impedance circuit 34, is chosen to resonate at a frequency substantially higher than the tunable range to be used by this amplifier, it is well known that impedance 34 will appear as a capacitive reactance at all frequencies below its resonance and consequently within the proposed operating range of the coupling network. This virtual capacitance represented by 34 will then be effectively in series with lump capacity 30 and therefore produce a resonant loop circuit in cooperation with variable inductance 28. The isolating capacitor 32 is necessarily present to prevent the application of positive plate potentials to grid 42 of vacuum tube 12, and may be made sufficiently high in capacity to cause it to offer an extremely low impedance path to signal frequencies between the variable inductance 28 and impedance circuit 34. Therefore the resonant frequency of the primary circuit will be largely determined by the value of variable inductance 28 and the series combination of lump capacity 30 and the virtual capacitance represented by circuit 34. Observing now the secondary or output circuit of the interstage coupling network, adapted to provide excitation to grid 42 of amplifier tube 12, it is seen that a similar resonant loop circuit exists here which comprises variable inductance 40 in series with virtual capacitance of the circuit 34 and lumped capacity 48. It is then apparent that the input circuit of the coupling network is coupled to the output circuit of the coupling network by means of the virtual capacity of circuit 34, since circuit 34 is common to both the input resonant loop circuit and the output resonant loop circuit.

The variable inductances 28 and 40 which may be mechanically varied simultaneously by a linkage indicated by dotted line 41 may then be adjusted to provide resonance of the input and output circuits at a variety of frequencies, the range of which we may conveniently assign to cover the television channels corresponding to 6 different center frequencies within the frequency range of 47 to 85 mc. As is well known to the art, the pass band width provided by two resonant circuits is a positive function of the degree of coupling existing between them and in this case is a positive function of the capacitive reactance provided by circuit 34. Also it will be remembered that for a given width of band pass between two coupled resonant circuits the co-efficient of coupling must necessarily be decreased as the operating or resonant frequency of the coupled system is increased. For example, let us assume that the input circuit and output circuit of the interstage coupling network by means of variable inductors 28 and 40 have been adjusted to provide resonance at the center frequency of a 44—50 mc. channel, namely 47 mc., and that circuit 34 has been adjusted for resonance at 109 mc. which is the highest oscillator frequency used for the reception of channels having center frequencies ranging from 47–85 mc. on a superheterodyne receiver employing a video intermediate frequency of approximately 21.75 mc. Under these conditions element 34 will appear as a capacitive reactance common to both the input and the output circuits, and through proper selection of the values of the inductor 36 and capacitor 38, may be made to provide a degree of coupling between the input and output circuits of a value that will impart to the coupling network a band pass of approximately 6 mc.

If now variable inductors 28 and 40 are tuned to resonate the input and output circuits to the center frequency 85 mc. of an 82–88 mc. channel it is apparent that the impedance of the series tuned circuit constituting circuit 34, with the network now being operated at a higher frequency, will necessarily provide a lower capacitive reactance and hence reduce the co-efficient of coupling between the primary and secondary circuits to an extent which may be made great enough to maintain a constancy of band pass width by the filter at this higher operating frequency. As previously reviewed, were the degree of coupling maintained constant, and the operating frequency increased, an obvious increase in band pass width would have resulted. Throughout the tuning range provided by elements 28 and 40 it is clear that the series resonant frequency of circuit 34 remains constant, and if tuned to within the range of frequency supplied by variable local oscillator 58, will provide very low impedance to these frequencies and hence reduce "back" coupling of the local oscillator energy. Also since a substantial member of image frequencies may also fall within the series resonance of circuit 34, considerable image attenuation is provided due to the subsequent low coefficient coupling effected by the low impedance of series circuit 34 in the image frequency ranges. It is noted that by changing the value of variable inductors 28 and 40 and by changing the resonant frequency of circuit 34, the coupling network may be made to cover a number of different bands of operating frequencies and so be adjusted to include channels having center frequencies within the 177–213 mc. range of the television spectrum.

Figure 2:
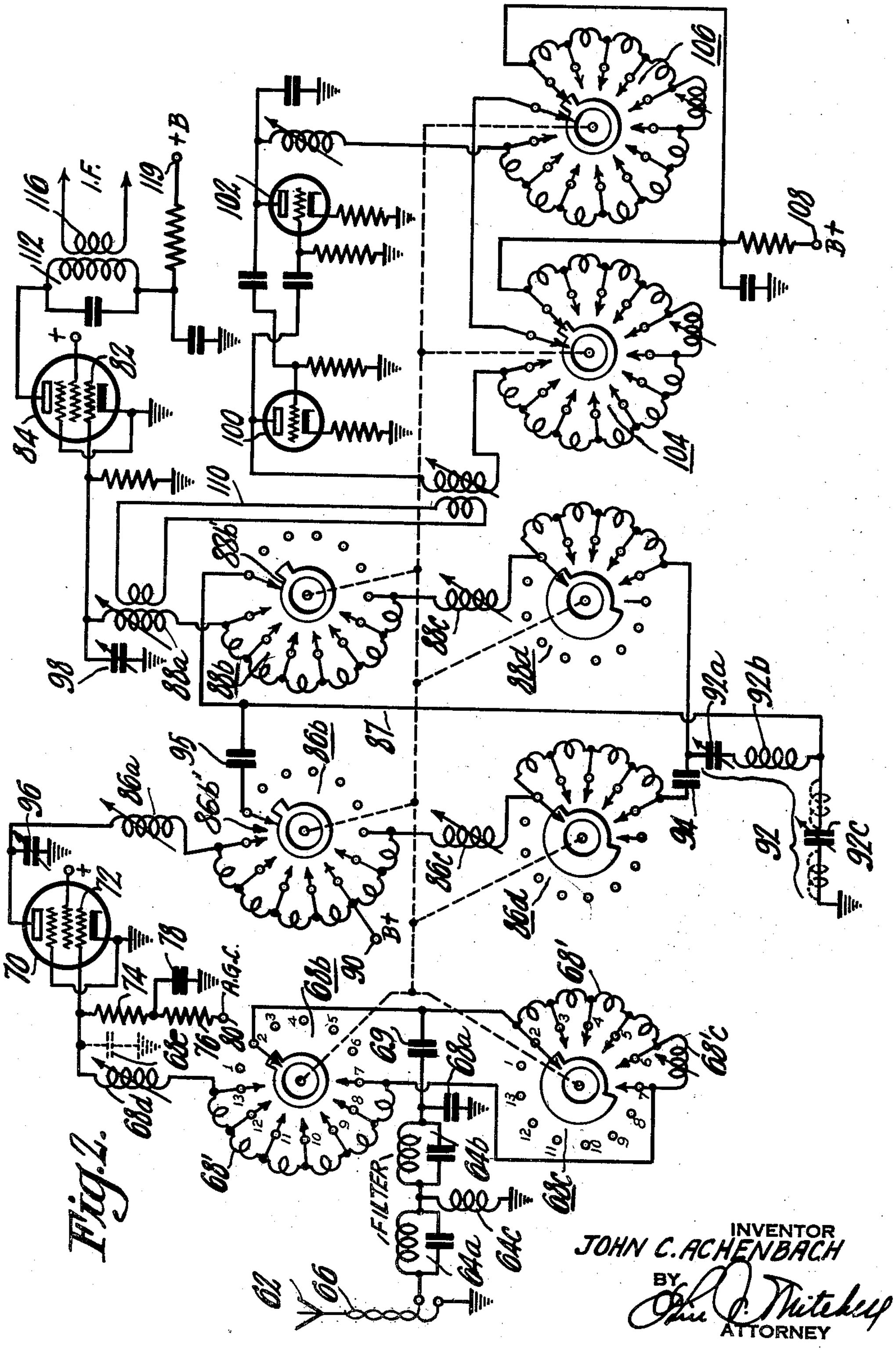
Figure 2 is a schematic representation of an embodiment of my invention.

Such dual-band coupling is provided for in the construction of a television tuner shown schematically in Figure 2, which offers service over 12 of the present 13 television channels. At the time of the design of this unit the 44–50 mc. channel of the television spectrum has been temporarily abandoned, however, the principles involved in the operation of the unit in Figure 2, now about to be described, permit its flexibility to include the addition of this channel to such a unit should it be desired to do so.

In the embodiment shown in Figure 2 the signal picked up by antenna 62 is passed through a high pass constant "K" type filter 64 comprising the T network made up of elements 64*a*, 64*b*, and 64*c*, having an input terminal impedance offering a proper termination for the transmission line 66 connected with antenna 62. This high pass filter may be made to have a cut-off just below the lowest television channel frequency to be received. The output of high pass filter 64 is then connected to a low pass "pi" filter 68 having its cut-off slightly above the highest television channel frequency to be received. This tunable low pass filter in pi form is made up of a shunt input arm provided by capacity 68*a*, a series inductance arm made up of two variable inductances in series namely inductors 68′ (rendered variable by means of switch gangs 68*b*, and 68*c*) and alignment inductance 68*d*, and an output shunt capacitance arm 68*e* comprised of the lumped stray and input capacity of the first vacuum tube 70. The low pass filter network 68 is also constructed to provide an impedance step-up from the 300 ohm antenna output to a suitable higher input impedance for the vacuum tube 70. Isolating capacitor 69 is of relatively high value and serves to block the automatic gain control (AGC) voltage appearing on the grid of vacuum tube 70.

Associated with the schematic representation of the gang switches 68*b* and 68*c* are small numbers from 1 to 13 to indicate the latching positions of the ganged switches. For example, the switching gangs are shown in position 2 for the reception of the lower frequency channel having a 57 mc. center frequency. It can readily be seen that in this position the series inductance of the low pass filter 68 is made up of trimmer inductance 68*d* in series with all of the inductance offered by switch gang 68*b* and all of the inductance offered by switch 68*c*. As progressively higher channels are sought in the range including channels having center frequencies of 47–85 mc., gang switch 68*c* introduces progressively, less series inductance up to and including the channel having an 85 mc. center frequency. As the range including channels having center frequencies of 177–213 mc. is entered, gang switch 68*b* by-passes the inductance provided by gang switch 68*c*, and permits the filter series inductance arm to be comprised practically in whole by the inductance on gang switch 68*b*. This variable series inductance for the low pass filter therefore is properly varied to permit operation throughout the present 12 channels of television frequencies. A variable trimming inductance 68*c*′ may be varied to execute overall alignment of the lower frequency channels having center frequencies in the 47–85 mc. range, whereas the variable trimming inductance 68*d* is properly positioned for the alignment of the higher frequency channels having center frequencies in the 177–213 mc. range. Suitable bias for control grid 72 of vacuum tube 70 is supplied through grid leak resistor 74 and the decoupling network comprised of series resistor 76 and by-pass condenser 78 from a source of automatic gain control voltage indicated at terminal 80.

The plate of vacuum tube 70 is then coupled to the control grid 82 of vacuum tube 84 by means of a tunable coupling network embodying the present invention. Reference will now be made to Figure 1 of the present application, and the description of the operation made in connection therewith will be employed as an aid in understanding the significance of the switching operations provided by the arrangement incorporated in the tunable coupling network.

The variable inductance for the coupling network input circuit as described in connection with element 28 of Figure 1 is provided in Figure 2 by the series inductance 86*a*, switch gang inductance 86*b*, variable inductance 86*c*, and switch gang inductance 86*d*, whereas the output circuit variable inductance indicated by circuit element 40 in Figure 1 is herein comprised of variable inductance 88*a* in combination with switch gang inductance 88*b*, variable inductance 88*c*, and switch gang inductance 88*d*. The plate supply energy for vacuum tube 70 supplied at a tap on the inductance associated with switch gang 86*b*, is derived from a source of positive potential indicated at terminal 90.

In operation in the present 5 low frequency channels having center frequencies in the 57–85 mc. range it will be seen through the connections shown in Figure 2 that the coupling network input circuit inductance includes the variable inductance element 86a, the entirety of the inductance element associated with switch gang 86b, the variable inductance element 86c, and successively lower values of inductance provided by gang switch 86d, as higher frequency ones of these channels are selected. Under these same conditions the output inductance of the coupling network comprises element 88a, inductance element associated with gang switch 88b, inductance element 88c, and successively lower values of inductance as provided by switching gang 88d upon selecting higher frequency ones of these channels.

For the lower frequency channels having center frequencies in the 57–85 mc. range, the common coupling impedance corresponding to circuit 34 in Figure 1 is comprised by elements 92a, 92b, and 92c. Blocking capacitor 94 which corresponds to element 32 of Figure 1, is appropriately chosen of sufficiently high capacity to offer a low impedance connection at the operating frequencies as previously indicated. The resonance of coupling elements 92 for the lower frequency ranges may be adjusted by varying the capacity of element 92a thereby affording a variety of frequencies at which the coupling network may be made to effect particular attenuation and also a control as to the band width transmitted by the network as heretofore described (in accordance with the foregoing description pertaining to Figure 1). The trimming inductances 86c and 88c provide means for aligning these lower frequency channels.

For operation on the higher frequency channels having center frequencies in the 177–213 mc. range, it is noticed that the inductance elements on gangs 86d and 88d (Fig. 2) are effectively by-passed by the shorting member 86b′ and 88b′ respectively while switch gangs 86b and 88b then provide connection to various taps available on the inductances associated therewith. As will be more clearly apparent hereinafter, circuit path 87 which provides connection to the impedance element 92c not only reduces the effective inductance network input and output circuits, which establishes resonance of the input and output circuits at a higher frequency, but also reduces the value of the impedance element 92 effective in coupling energy from the input circuit to the output circuit. This action therefore yields the requisite reduction in input to output circuit coupling at the higher frequency channels compared with that at the lower frequency channels and also increases the resonant frequency of the common impedance element so as to effect attenuation of the attendant higher image and local oscillator frequencies associated with the operation of the superheterodyne receiver at these higher frequency television channels. Condenser element 95 serves as the blocking capacitor having the same purpose as condenser 94 (Fig. 2) or condenser 32 (Fig. 1).

Detailed and simplified schematic diagrams of the elements associated with the switching arrangement in connection with the coupling network only, are shown in Figures 3 and 4. Like parts and/or their equivalents, have been given like numbers to those assigned in Figure 2. Figure 3 shows the configuration of the coupling network as it is used in the lower frequency channels having center frequencies in the 57–85 mc. range, wherein the circuit 92 common to the input and output circuits comprises the elements 92a, 92b, and 92c, and circuit path 87 is shown in dotted lines in order to indicate that it is nonfunctional in the operation of the network for these lower frequency channels. Figure 4 is the schematic representation of the same elements shown in Figure 3 now connected through switch gang action for reception of the higher frequency channels having center frequencies in the 177–213 mc. range. Correspondingly those elements which are not functional or are of negligible importance in providing the resonance and band pass of the coupling network, at these higher frequencies are shown in dotted lines, as well as inductors 92c′ and 92c″, which as hereinafter explained function in the operation of the invention. Consequently it is apparent that in the range of the higher frequency channels the circuit 92 common to the input and output circuits substantially comprises effectively element 92c only, which represents a reduction in coupling coefficient as compared with that obtained in Figure 3. Since it is desirable in the operation of the present invention that the common coupling circuit 92 provide resonance in the image or local oscillator frequency range of the superheterodyne receiver, this resonance is obtained through the effective inductance of the leads of the condenser 92c. This inductance is schematically indicated by the dotted line symbols 92c′ and 92c″ and by adjusting the length of the condenser leads, the resonant frequency and the initial degree of coupling, as well as image frequency attenuation, can be controlled.

Referring again to Figure 2, trimmer capacitors 96 and 98 are provided to supplement the stray wiring capacity and output and input capacities of vacuum tubes 70 and 84 respectively. These variable capacitors provide a convenient manner in which to adjust or compensate for changes in vacuum tube characteristics that occur either with age or through actual replacement. Variable inductances 86a and 88a are useful in providing alignment of the network at channels having higher frequencies, whereas variable inductance elements 86c and 88c provide alignment adjustment for the lower frequency channels.

Vacuum tubes 100 and 102 in Figure 2 are shown connected in a conventional push-pull oscillator arrangement. Variable inductances for the plate circuits of this oscillator are associated with ganged switches 104 and 106 through which inductances plate supply energy for the oscillator tubes is derived from B+ power supply terminal 108. The energy from the oscillator is applied to the input electrode of vacuum tube 84 through link 110 which inductively couples the oscillator signal to variable inductance 88a. According to well known superheterodyne principles the presence of a carrier signal as derived from the coupling network in conjunction with oscillator energy on the control grid 82 of vacuum tube 84 provided by the local oscillator tubes 101 and 102, will produce the appearance of a heterodyne difference frequency (known as the intermediate frequency) in plate load 112 when the tube 84 is supplied with suitable plate supply energy from power supply terminal 119. The intermediate frequency signal appearing in the plate circuit 112 may then be inductively coupled to appropriate intermediate amplifiers situated in the remainder of the television receiver, an inductively coupled output winding 116 being indicated for this purpose.

From the foregoing it is apparent that the present invention supplies a novel and economical method of interstage coupling suitable for application to radio frequency amplifiers of the type used in television reception, and that particular advantages are derived therefrom in that constancy of band pass for any available tunable operating frequency is achieved concurrently with image frequency and local oscillator frequency attenuation.

Although applicant's invention has been shown and described in connection with a television receiver for which it is particularly well adapted, it is not intended that its employment shall be limited thereto.

What is claimed is:

1. In a tunable electronic radio frequency wave translating system, a first electronic discharge tube having an anode and a cathode, means connecting said cathode with a fixed reference potential point, a second electronic discharge tube having a control grid, an anode, and a cathode, means connecting said second electronic discharge tube cathode with a fixed potential point, a coupling network connected to communicate electrical wave energy from the plate circuit of said first electronic discharge tube to the control grid of the second electronic discharge tube, said network comprising at least two components, firstly a series impedance connected between said first electronic discharge tube anode and said second electronic discharge tube control grid, and secondly, a shunt impedance connected between first mentioned series impedance and a fixed potential point, said series impedance comprising the series connection of a first variable inductance, a blocking capacitor and a second variable inductor, said shunt impedance comprising the series connection of a fixed inductance with a fixed capacitance comprising a series resonant circuit having a predetermined resonant frequency, said shunt impedance being in turn connected to said series impedance at the junction of said blocking capacitor and said second variable inductor, and means operative to vary said first variable inductor and said second variable inductor simultaneously, such that the total anode to ground capacitance of said first electronic discharge tube resonates said first electronic discharge tube anode circuit to substantially the same frequency as the total control grid to ground capacitance of said second electronic discharge tube resonates said second electronic discharge tube grid circuit, said anode and grid circuit resonant frequencies being lower than said predetermined frequency and said wave translating system, thereby, having a frequency band pass which is substantially independent of the frequency to which said first electronic discharge anode circuit and the second electronic discharge tube grid circuit is resonant, said system further effecting marked attenuation of the wave frequency to which said shunt impedance circuit is resonant.

2. A variably tunable four terminal passive linear network forming an interstage coupling of electronic discharge tubes in a radio frequency wave translating device, said network having a first input terminal and a second input terminal and a first output terminal and a second output terminal, a complex variable impedance connecting said first input terminal to said first output terminal, said variable impedance comprising the series connection of a first variable inductor and a second variable inductor, a connection between said second input terminal and said second output terminal, said connection having a low value of reactive impedance, a shunt impedance connected from said series impedance to said second input and output terminals, said shunt impedance comprising a series resonant circuit coupling said first and second inductors, and means to simultaneously adjust said first variable inductor to obtain resonance of said input circuit over a range of operating frequencies and said second variable inductor to obtain resonance of said output circuit over a similar range of operating frequencies, said series resonant circuit being resonant at a fixed frequency higher than the highest resonant operating frequency of either said input or said output circuits to impart to said network a substantially constant frequency band width throughout a large range of network operating frequencies determined by the simultaneous adjustment of said first and second inductors, and to further impart to said network a high attenuation of wave frequencies corresponding to the resonant characteristics of said shunt impedance.

3. In a radio frequency superheterodyne receiving system, a radio frequency wave translation system tunable to receive a wide range of signal frequencies, said system including one or more electronic tube stages, a local oscillator wave generating means having operating frequencies above said range of signal frequencies, a variably tunable passive linear network comprising an interstage coupling of said vacuum tube stages, said network comprising a variably tunable primary circuit, means operative to variably tune said primary circuit and said secondary circuit simultaneously, a variably tunable secondary circuit, and a coupling circuit series resonant at a signal image frequency falling within the frequency range of local oscillator operation such that said series circuit appears as an effective capacitive reactance which varies with frequency, said coupling circuit being common to said primary and secondary circuits to provide electrical coupling between said primary and secondary circuits of a nature that imparts to said network a frequency band pass which is maintained substantially constant for wide variations in tuning of said primary and secondary circuits while causing said network to display particular attenuation of those signal image frequencies and oscillator frequencies encompassed by the selectivity characteristics of said resonant coupling circuit.

JOHN C. ACHENBACH.

REFERENCES CITED

The following references are of record in the file of this patent:

UNITED STATES PATENTS

| Number | Name | Date |
|---|---|---|
| 1,955,130 | Israel | Apr. 17, 1934 |
| 2,136,664 | Barber | Nov. 15, 1938 |
| 2,153,738 | Braden | Apr. 11, 1939 |
| 2,157,170 | Grundmann | May 9, 1939 |
| 2,207,796 | Grundmann | July 16, 1940 |
| 2,217,839 | Grundmann | Oct. 16, 1940 |
| 2,240,295 | Grundmann | Apr. 29, 1941 |
| 2,252,609 | Beck | Aug. 12, 1941 |
| 2,270,017 | Brailsford | Jan. 13, 1942 |
| 2,284,131 | Case | May 26, 1942 |

FOREIGN PATENTS

| Number | Country | Date |
|---|---|---|
| 477,048 | Great Britain | Dec. 21, 1937 |